(12) United States Patent
Sonti et al.

(10) Patent No.: US 7,236,461 B1
(45) Date of Patent: Jun. 26, 2007

(54) LINK EFFICIENCY SCHEMES FOR PACKET TRANSPORT

(75) Inventors: Jagdish V. Sonti, Cupertino, CA (US); Tmima Koren, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1030 days.

(21) Appl. No.: 10/267,427

(22) Filed: Oct. 8, 2002

(51) Int. Cl.
H04J 3/02 (2006.01)

(52) U.S. Cl. .................................. 370/252; 370/538
(58) Field of Classification Search ................ 370/389, 370/537, 535, 252, 254, 468, 229–235, 503
See application file for complete search history.

(56) References Cited

U.S. PATENT DOCUMENTS

| | | | |
|---|---|---|---|
| 6,160,819 A | 12/2000 | Partridge et al. | 370/474 |
| 6,347,091 B1* | 2/2002 | Wallentin et al. | 370/437 |
| 6,564,267 B1 | 5/2003 | Lindsay | 709/250 |
| 6,577,644 B1 | 6/2003 | Chuah et al. | 370/466 |
| 6,760,303 B1* | 7/2004 | Brouwer | 370/229 |
| 7,054,269 B1* | 5/2006 | Luguern et al. | 370/232 |
| 7,099,346 B1* | 8/2006 | Kanterakis | 370/431 |
| 2002/0126710 A1* | 9/2002 | Bergenwall et al. | 370/535 |

* cited by examiner

*Primary Examiner*—Chau Nguyen
*Assistant Examiner*—Ken Hartmann
(74) *Attorney, Agent, or Firm*—Baker Botts L.L.P.

(57) ABSTRACT

In a communication network, link efficiency modules aggregate packets into multiplexed packets to provide efficient use of communication links. To handle varying levels of network traffic, the link efficiency modules provide multiple modes of operation to balance bandwidth efficiency against packet latency.

26 Claims, 3 Drawing Sheets

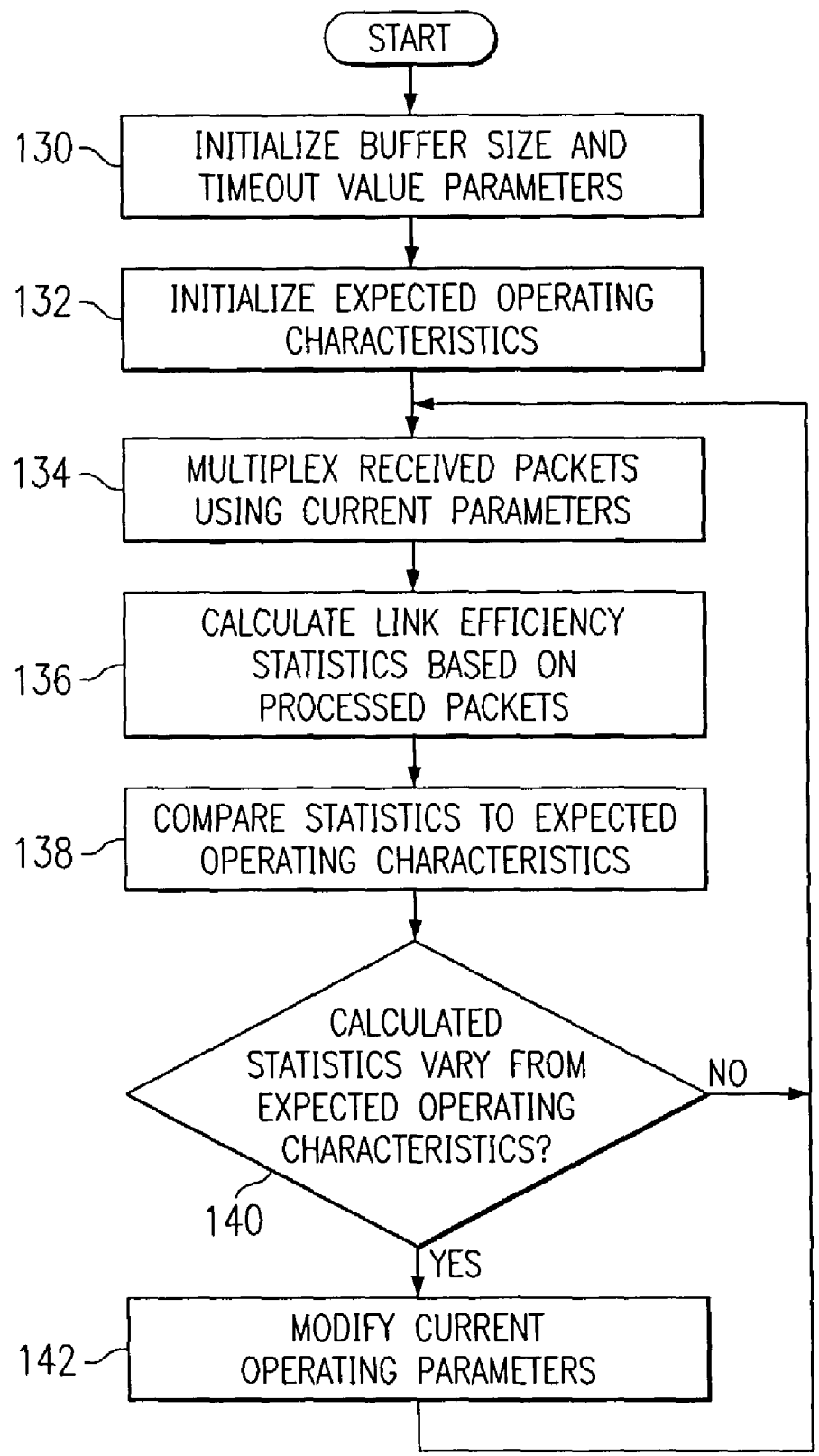

LINK EFFICIENCY SCHEMES FOR PACKET TRANSPORT

TECHNICAL FIELD OF THE INVENTION

The present invention relates in general to packet transportation networks and, more specifically, to link efficiency schemes for packet transport.

BACKGROUND OF THE INVENTION

Within telephony networks, not all communication links have equal bandwidth. This results in potential bottlenecks through some links. To prevent these connections from affecting information transportation, some elements will aggregate information to more effectively use bandwidth through potential bottlenecks.

SUMMARY OF THE INVENTION

In accordance with the present invention, link efficiency schemes for packet transport are provided.

According to a particular embodiment, a method for multiplexing packets across varying traffic densities initializes operating parameters using a first set of multiplexing parameters designed for a first level of packet traffic, receives packets using a first interface, forms a multiplexed packet with one or more of the received packets each time the operating parameters are satisfied, and transmits each formed multiplexed packet using a second interface. The method monitors operating characteristics that predict traffic density at the first interface, determines that the operating characteristics indicate traffic density below a threshold, and in response to the determination, reinitializes the operating parameters using a second set of multiplexing parameters designed for a second level of packet traffic.

Embodiments of the invention provide various technical advantages. These techniques provide efficient bandwidth utilization to avoid bottlenecks while dynamically varying operation to handle different traffic levels. Thus, particular embodiments prevent peak operating characteristics from impacting off peak communications. For example, particular embodiments provide variation of operating parameters based upon traffic conditions to prevent the operating parameters from causing delays that may impact voice quality.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 5 is a flowchart illustrating a method for dynamically adjusting link efficiency operation based upon monitored traffic.

DETAILED DESCRIPTION OF THE DRAWINGS

Figure 1:
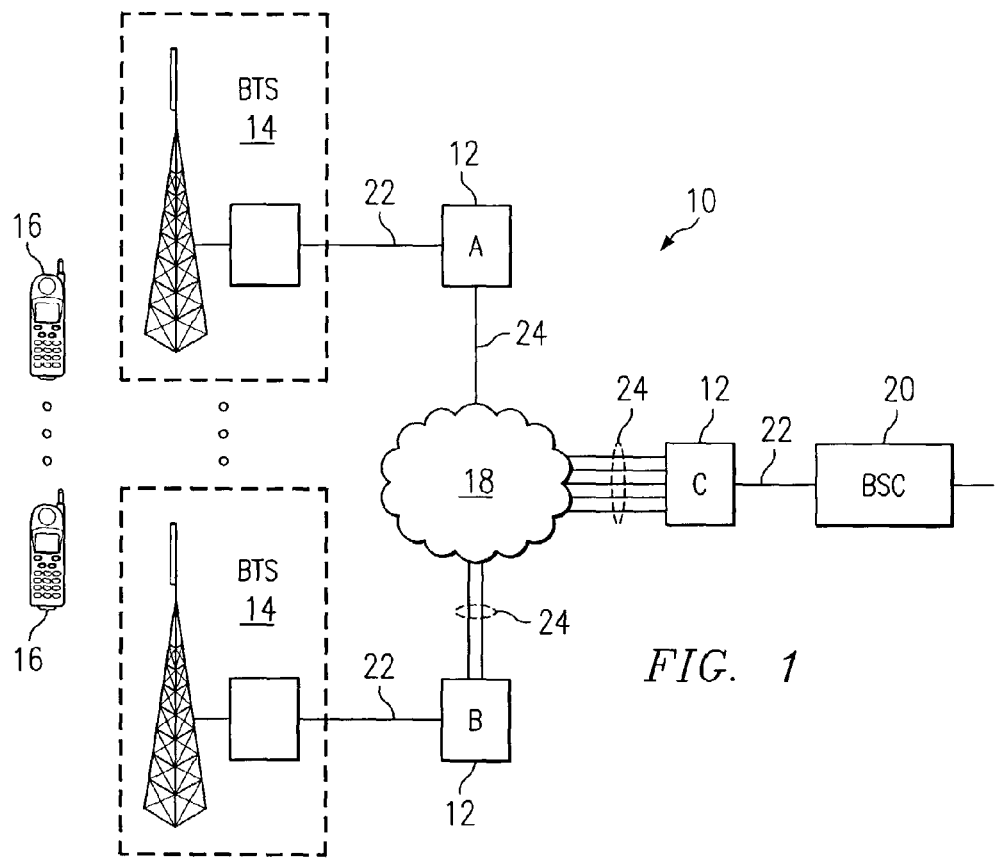
FIG. 1 illustrates a telephony communication system having link efficiency modules operating in accordance with various embodiments of the present invention.

FIG. 1 illustrates a telephony communication system, indicated generally at 10, that includes link efficiency modules 12, which provide packet multiplexing using a dynamic multiplexing scheme. In the embodiment illustrated, system 10 also includes base transceiver stations 14, mobile devices 16, a carrier network 18, and a base station controller 20. Within system 10, elements interconnect using various links, such as high-speed links 22 and low-speed links 24. In general, link efficiency modules 12 interface between high-speed links 22 and low-speed links 24 and provide dynamically varying packet multiplexing across low-speed links 24 to enable efficient bandwidth usage while accounting for variations in packet traffic density.

In the embodiment illustrated, system 10 provides mobile devices 16 access to voice and/or data services through elements of a wireless communication network. While illustrated as wireless telephones, mobile devices 16 may be any appropriate wireless communication devices, such as portable digital assistants (PDAs), wireless enabled computers, pagers, or other suitable wireless communication devices. To support wireless communications, system 10 includes elements of a wireless communication network, including base transceiver stations 14 and base station controller 20. Base transceiver stations 14 support wireless connections with mobile devices 16 to provide devices 16 access to voice and/or data networks. Thus, stations 14 represent hardware and associated logic, such as towers and processing equipment, for establishing wireless communication links with mobile devices 16.

Base station controller 20 represents hardware and controlling logic that handles traffic for one or more base transceiver stations 14. Base station controller 20 provides connectivity with voice and/or data networks. For example, base station controller 20 may link with a mobile switching center that provides access to telephony networks such as the public switched telephone network (PSTN). Base station controller 20 may further link to an internet protocol (IP) network to provide packet based data services.

Base station controller 20 and base transceiver stations 14 provide interfaces for supporting high data rate transmissions. However, base transceiver stations 14 and base station controller 20 typically link to each other over bandwidth constrained communication links. For example, stations 14 and controller 20 may connect using leased T1 or E1 lines provided by a third party carrier. Because these lines are often expensive, network designers attempt to minimize the number of interconnecting lines, resulting in the potentially bandwidth constrained connections between stations 14 and controller 20. Therefore, this description refers to high-speed links 22 and low-speed links 24. However, these terms are not meant to limit the operational characteristics of these interconnections or to designate relative transmission speeds. Rather, these terms are merely meant to illustrate the potential bandwidth constraints that link efficiency modules 12 attempt to accommodate.

Link efficiency modules 12 provide multiplexing of information to permit more efficient bandwidth utilization. This enables relatively unconstrained traffic on high-speed links 22 to be transported without serious delays across low-speed links 24. To efficiently communicate information across low-speed links 24, link efficiency modules 12 aggregate multiple packets into multiplexed packets for point-to-point delivery from one link efficiency module 12 to another link efficiency module 12.

For example, for packet communications from station 14 to base station controller 20, link efficiency module 12 labeled A (module A) will deliver multiplexed packets to link efficiency module 12 labeled C (module C). To form a multiplexed packet, module A aggregates one or more packets into a single multiplexed packet and transmits the multiplexed packet to module C. The multiplexed packet may be, for example, a point-to-point protocol (PPP) packet that encapsulates multiple user datagram protocol (UDP) packets. Thus, the multiplexed packet may have a PPP header and trailer surrounding one or more UDP packets received from station 14. To further reduce bandwidth usage on low-speed links 24, modules 12 may compress portions of packets received from stations 14. For example, modules 12 can typically compress UDP headers from 28 bytes to 3 bytes without impacting communications. However, while this example illustrates encapsulation of UDP packets within a PPP packet, system 10 contemplates link efficiency modules 12 aggregating any appropriate types of packets for point-to-point delivery using any suitable protocols.

When aggregating packets, module 12 uses various parameters to determine how to form a multiplexed packet. According to particular embodiments, these parameters include a buffer size and a timeout value. When module 12 receives sufficient packets to fill a buffer, module 12 forms those packets into a multiplexed packet and transmits the multiplexed packet. To prevent packets from unduly languishing in the buffer until it becomes filled, module 12 may form a multiplexed packet whenever the time from the last multiplexed packet meets or exceeds the timeout value. This enables module 12 to handle time sensitive information, such as voice communications, without introducing undue delay.

The values used for buffer size and timeout parameters impact the operation of module 12 differently during different levels of traffic intensity. During periods of heavy network traffic, a small value for the buffer size parameter may result in inefficient link usage, and module 12 may not be able to handle all of the traffic with low-speed link 24. Thus a sufficient buffer size parameter can be critical during peak traffic periods. During off-peak periods, a relatively large buffer size may cause module 12 to rely upon the timeout parameter to determine when to transmit packets that have been accumulated for a relatively large proportion multiplexed packets. This can result in unnecessary delay of packets, since "unfilled" multiplexed packets sit in the buffer until the timeout. Therefore, parameters that provide effective operation during peak traffic periods may cause undue transmission delays during off-peak periods.

To handle different traffic densities, modules 12 provide two or more modes of operation. According to particular embodiments, modules 12 provide two modes of operation, one for peak traffic periods and one for off-peak traffic periods. During peak times, modules 12 use operating parameters designed to handle peak traffic conditions. During off-peak times, modules 12 use operating parameters designed to reduce packet latency while potentially sacrificing bandwidth efficiency. However, because of the lighter traffic density, the decreased bandwidth efficiency will likely not affect capacity.

As an example, consider module 12 configured to provide peak and off-peak operational modes. During peak traffic, module 12 uses a buffer size value of 250 bytes and a timeout value of two milliseconds. Thus, upon receiving packets totaling at least 250 bytes or if two milliseconds has passed since the last multiplexed packet, module 12 communicates a multiplexed packet. During off-peak periods, module 12 uses a buffer size value of 100 bytes and a timeout value of two milliseconds. Thus, instead of waiting for packets totaling at least 250 bytes, module 12 only waits for 100 bytes of information. In this scenario, module 12 maintains a constant value for the timeout parameter regardless of the operational mode. This permits the timeout value to reflect underlying network requirements. For example, an administrator may set the timeout parameter at or near to a maximum delay allocated for this particular segment of network communications.

The preceding example provides specific values for operation of module 12 during peak and off-peak modes. However, these values are merely illustrative, and system 10 contemplates modules 12 using any suitable values, based upon network operation, parameters, requirements, protocols, and/or other appropriate criteria. Also, while this example illustrates module 12 performing packet multiplexing during both peak and off-peak periods, system 10 contemplates modules 12 completely disabling packet multiplexing at appropriate times. Thus, for example, modules 12 may perform packet multiplexing during peak operation and perform no packet multiplexing during off-peak operation. Moreover, while the example provides for two modes of operation, system 10 contemplates modules 12 providing any number of operational modes to respond to varying network traffic densities.

During operation, module 12 varies its mode of operation based on traffic characteristics. The following description details three particular embodiments for determining a current mode of operation for module 12. According to one embodiment, modules 12 rely upon upstream network traffic information to determine a current mode of operation. For example, module A relies upon information from the attached station 14 to determine a current mode of operation for multiplexing packets for delivery to module C. Similarly, module C relies upon information from the attached controller 20 to determine a mode of operation for multiplexing packets for communication to module A. This demonstrates the potential one-way decision-making process used by modules 12. That is, modules 12 on opposite sides of a point-to-point connection may operate in different modes depending upon network traffic in each direction.

For example, if station 14 provides traffic information to module A that indicates peak or near peak usage, module A operates in peak mode. However, the operation of module A need not impact the current mode of operation for module C. Thus, if controller 20 indicates relatively light traffic coming from attached networks, module C may operate in off-peak mode.

When operating according to this scheme, elements providing packets to modules 12 should be configured to provide network traffic information. This potentially enables modules 12 to determine a mode of operation using perspective traffic information. However, system 10 contemplates modules 12 multiplexing packets received from any number and type of network elements. For example, a single module 12 may simultaneously service packets from stations 14, fixed wireless access points and other network elements. If some of these devices do not provide upstream network traffic information, module 12 may be unable to appropriately determine a mode of operation using this scheme.

According to another embodiment, modules 12 use link usage statistics for low-speed links 24 to determine a current mode of operation. In this embodiment, module 12 monitors information, such as traffic and utilization of low-speed link 24, to determine whether or not to operate in peak mode. This permits module 12 to determine its mode of operation based upon downstream information that can be directly monitored.

According to other embodiments, module 12 may determine a current mode of operation based upon traffic flow and operating characteristics. For example, module 12 may determine a mode of operation by monitoring multiplexing operation as compared to preset and/or historical operational characteristics. Using this scheme, module 12 can determine a current mode of operation based purely upon packet processing, without relying upon upstream or downstream traffic information.

In a particular embodiment, module 12 compares its recent performance in multiplexing packets to expected operational characteristics to determine whether or not to switch between modes. For example, through analysis, an administrator may determine that module 12 sends 99% of multiplexed packets based upon the buffer size parameter during "healthy" operation. This means that, during healthy operation, module 12 communicates undersized multiplexed packets because of the timeout value only one percent of the time. If module 12 determines that recent operation has resulted in timing out significantly more than one percent, module 12 may reduce its buffer size parameter. Similarly, if module 12 determines that recent operation has timed out significantly less than one percent, module 12 may increase the buffer size parameter. This technique permits dynamic variation through a range buffer sizes based upon analysis of internal operation. However, while the preceding description provides a specific method for adjusting buffer size and provides specific values, system 10 contemplates modules 12 using any appropriate internal monitoring of operations, values and thresholds as appropriate to switch between modes of operation.

The preceding description details particular embodiments for dynamically varying the mode of multiplexing operation based upon information such as upstream and downstream traffic and internal operations of module 12. Because each scheme can provide particular advantages, system 10 contemplates modules 12 using one or more of these techniques, alone or in combination, during operation. Moreover, system 10 contemplates modules 12 using other techniques for dynamically varying operational modes to adjust packet multiplexing activity in accordance with network traffic activity. Also, while system 10 illustrates modules 12 operating to multiplex packets for a specific type of network, the disclosed concepts may be suitable for multiplexing packets in any system with point-to-point traffic that exhibits variable traffic densities.

Figure 2:
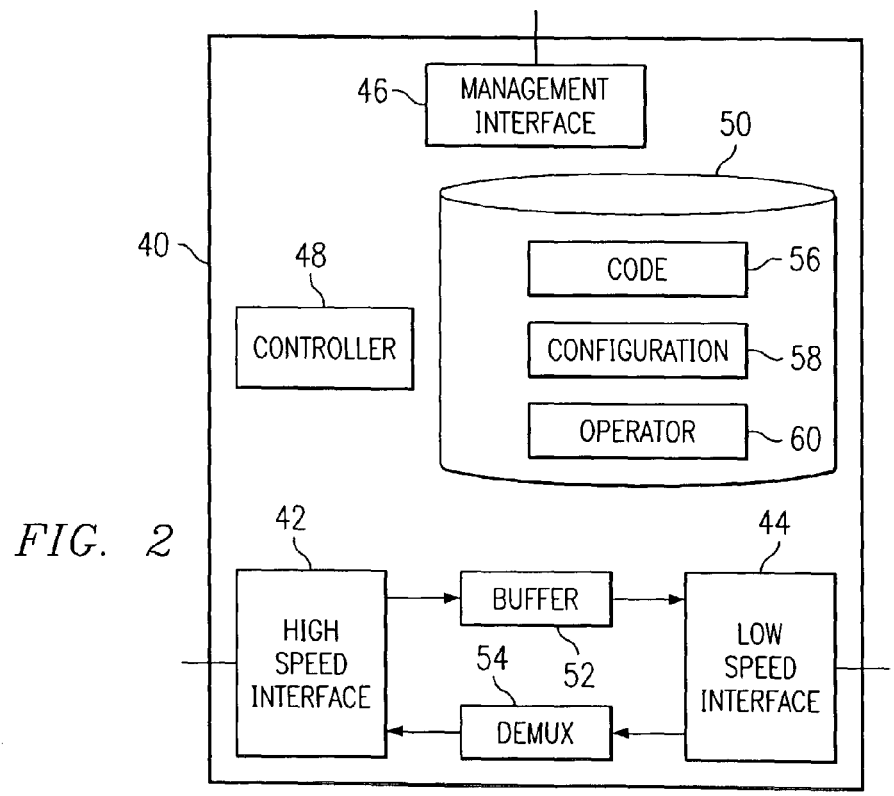
FIG. 2 is a block diagram illustrating exemplary functional components for a particular embodiment of a link efficiency module.

FIG. 2 is a block diagram illustrating exemplary functional elements for a link interface module 40 that includes a high-speed interface 42, a low-speed interface 44, a management interface 46, a controller 48, and a memory 50. Module 40 further includes a buffer 52 and a demultiplexer 54 coupled between high-speed interface 42 and low-speed interface 44. In operation, module 40 provides multiplexing and demultiplexing of packets to provide efficient bandwidth utilization of network link. Module 40 receives packets using high-speed interface 42 and aggregates these packets into multiplexed packets for transmission using low-speed interface 44. Module 40 varies its multiplexing activities based upon network traffic densities. Thus, module 40 provides multi-modal operation to dynamically adjust multiplexing activity to accommodate varying network traffic.

High-speed interface 42 provides a link to one or more network elements across a relatively high bandwidth connection. For example, high-speed interface 42 may link module 40 to one or more stations 14 or may link module 40 to base station controller 20. Similarly, high-speed interface 42 may link module 40 to any appropriate network elements that generate packets. Low-speed interface 42 provides an interface to one or more bandwidth constrained network connections. Using low-speed interface 44, module 40 may couple to one or more remote modules 40. These interfaces 42 and 44, while each depicted with a single link, may include any number and type of connections and pathways formed through any appropriate media. For example, these interfaces may have multiple ports for coupling to a number of transport lines and may use multiple pathways on any number of these lines.

Management interface 46 provides an interface for module 40 to receive management and operational information. For example, through management interface 46, an administrator may establish settings and configurations within module 40. Also, through management interface 46, module 40 may receive upstream network traffic information from other network elements. For example, management interface 46 may couple to station 14 and permit station 14 to supply traffic information, such as wireless link utilization.

Buffer 52 stores packets received using high-speed interface 42. Buffer 52 enables module 40 to generate multiplexed packets that aggregate multiple packets received using high-speed interface 42. Demultiplexer 54 separates multiplexed packets received at low-speed interface 44 into separated packets for transmission by high-speed interface 42. Thus, demultiplexer 54 reverses the operation of a remote module 40 in multiplexing packets. Controller 48 controls the management and operation of module 40. For example, controller 48 may represent a microprocessor or a programmed logic device that executes logical expressions to control the other elements within module 40.

During operation, elements within module 40 may access information contained within memory 50. In the embodiment illustrated, memory 50 maintains code 56, configuration information 58, and operational information 60. Code 56 represents software or other suitable logic for execution by other elements within module 40. For example, code 56 may include microcode for execution by controller 48 to perform multimodal packet multiplexing. Configuration information 58 includes settings and other appropriate data for controlling the operation of module 40. For example, configuration information 48 may include buffer sizes and timeout values for various modes of operation, thresholds for determining when to switch between modes of operation, and other suitable settings. Operational information 60 details network operating characteristics tracked by module 40. For example, operating information 60 may include upstream network traffic information supplied by other elements of system 10. Similarly, operating information 60 may include link operation statistics detailing the performance of low-speed interface 44 for communications on a low-speed link. Operating information 60 may also track performance of module 40 in multiplexing packets received using high-speed interface 42. This performance information may, for example, permit module 40 to adjust its operational mode without relying upon upstream traffic information or the operation of low-speed interface 44.

During operation, module 40 provides multimodal packet multiplexing, varying operation in accordance with network traffic. Module 40 supports multimodal operation using, for example, techniques such as those described above. Module 40 also provides for demultiplexing of multiplexed packets received from remote devices.

While the illustration and preceding description focus on a particular embodiment of module 40 that includes specific elements, system 10 contemplates module 40 having any suitable combination and arrangement of elements for providing dynamically adjustable packet multiplexing. Thus, the modules and functionalities described may be combined, separated, or otherwise distributed among any suitable functional components, and some or all of the functionalities of module 40 may be performed by logic encoded in media, such as software and/or programmed logic devices.

Figure 3:
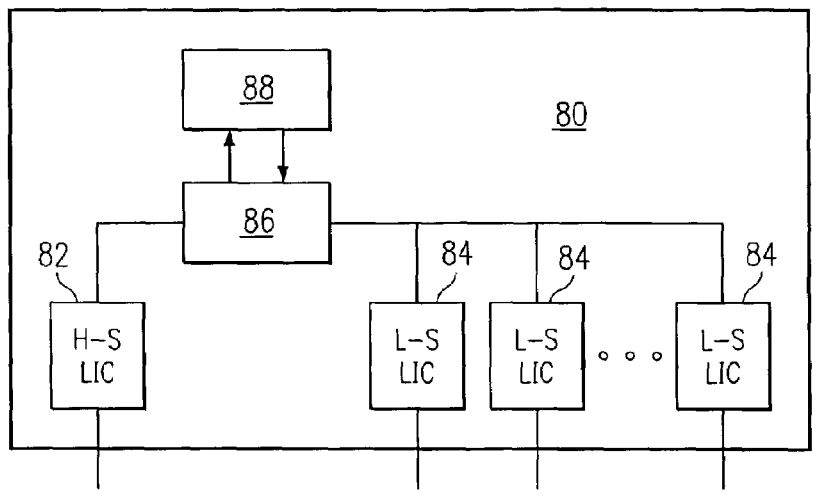
FIG. 3 is a block diagram illustrating exemplary functional components for another embodiment of a link efficiency module.

FIG. 3 is a block diagram illustrating another potential configuration and elements for implementing a link efficiency module 80. In the embodiment illustrated, module 80 includes a high-speed line interface card 82, multiple low-speed line interface cards 84, a routing module 86, and a multiplexing module 88. Multiplexing module 88 provides a separate element for handling the aggregation of packets into multiplexed packets. This may, in certain embodiments, restrict the access of multiplexing module 88 to upstream and/or downstream network traffic information. Therefore, the particular embodiment illustrated may lend itself to multimodal operation based upon internal monitoring of operations.

High-speed line interface card 82 couples module 80 to one or more high-speed links 22. Similarly, low-speed line interface cards 84 couple module 80 to one or more low-speed links 24. During operation, high-speed line interface card 82 receives packets for transmission by low-speed line interface cards 84. Similarly, low-speed line interface cards 84 receive packets for transmission by high-speed line interface card 82. According to particular embodiments, the link provided by high-speed line interface card 82 provides greater bandwidth than the links provided by low-speed line interface cards 84. Thus, at certain times, module 80 uses multiplexing module 88 to aggregate packets from high-speed line interface card 82 into multiplexed packets for transmission by low-speed line interface cards 84.

Routing module 86 provides for routing of packets between various line interface cards 82, 84. For example, routing module 86 may distribute packets received by high-speed line interface card 82 among low-speed line interface cards 84. For packets received by low-speed line interface cards 84, routing module 86 can forward these packets for transmission by high-speed line interface card 82. For multiplexed packets received by low-speed line interface cards 84, routing module 86 further provides for demultiplexing of these packets into their constituent packets. Therefore, routing module 86 can reverse the multiplexing process performed by a remote link efficiency module.

In the embodiment illustrated, multiplexing module 88 is a separate element from routing module 86. Thus, for example, multiplexing module 88 may be an element such as a daughter card that supports multimodal packet multiplexing. To perform these operations, multiplexing module 88 includes any suitable hardware and controlling logic. For example, multiplexing module 88 may include selected components as illustrated in module 40.

Because multiplexing module 88 is separate from routing module 86, multiplexing module 88 may not have access to upstream traffic information or link utilization statistics of low-speed line interface cards 84. Therefore, multiplexing module 88 may rely upon internal operation to adjust its packet multiplexing operations and/or switch between modes of operation. Therefore, multiplexing module 88 may use methods such as those described above that do not rely upon upstream or downstream traffic information.

However, multiplexing module 88 may couple to other elements of system 10 and/or interface with various elements of module 80 to access upstream and/or downstream traffic information. Thus, multiplexing module 88 may use any suitable techniques and information to dynamically adjust packet multiplexing operation in accordance with network traffic.

While this illustration and the accompanying description focus on a particular embodiment of module 80 that includes specific elements, system 10 contemplates module 80 having any suitable combination and arrangement of elements for providing dynamically varying packet multiplexing operations. Thus, the modules and functionalities described may be combined, separated, or otherwise distributed among any suitable functional components, and some or all of the functionalities of module 80 may be performed by logic encoded in media, such as software and/or programmed logic devices. Moreover, one of skill in the art will appreciate that some or all of the elements of module 40 and module 80 may be used in combination.

Figure 4:
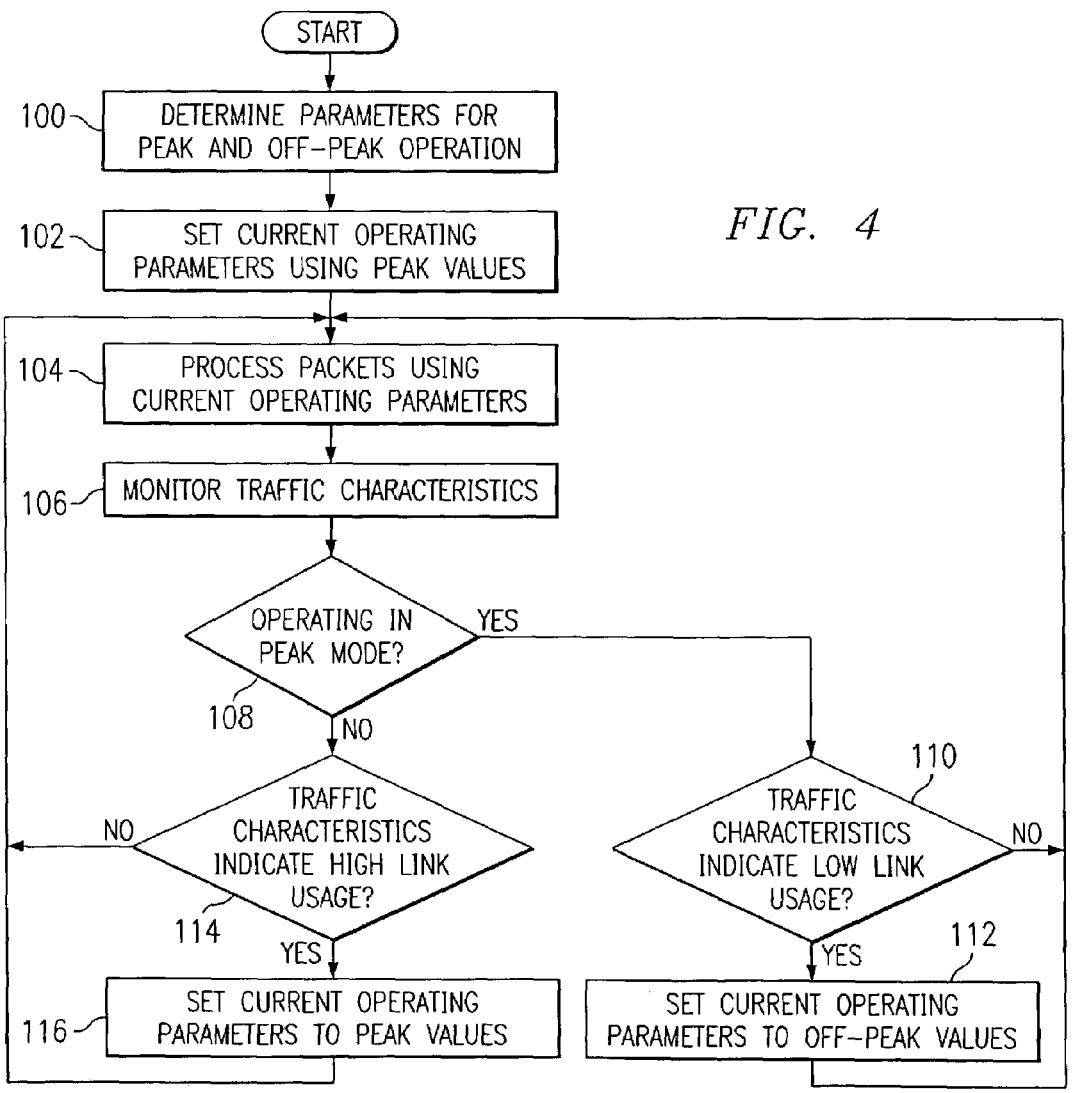
FIG. 4 is a flowchart illustrating a method for varying packet processing parameters to account for different traffic levels.

FIG. 4 is a flowchart illustrating a method for performing packet multiplexing using a dual mode scheme that dynamically adjusts for peak or off-peak operation. The following description will focus on the operation of module 12. Module 12 determines parameters for peak and off-peak operations at step 100. For example, module 12 may access buffer size and timeout parameters for peak and off-peak operations that are stored within memory. Module 12 sets current operating parameters using peak values at step 102. By beginning operation in peak mode, module 12 ensures that the current operational mode will be sufficient to handle any level of network traffic. However, as previously discussed, while peak mode provides maximum bandwidth efficiency, it can result in increased packet latency during slower traffic periods.

Module 12 processes packets using current operating parameters at step 104. As noted, module 12 initially uses peak operating parameters. Module 12 monitors traffic characteristics at step 106. For example, module 12 may receive upstream network traffic information from elements supplying packets over high-speed link 22. Alternatively, or in addition, module 12 may monitor downstream traffic characteristics and/or internal operations. Module 12 analyzes the traffic characteristics based upon the current mode of operation. Thus, module 12 determines whether it is operating in peak mode at step 108. If so, module 12 determines whether the traffic characteristics indicate low link usage at step 110. For example, module 12 may compare upstream network traffic information against thresholds to determine whether traffic is sufficiently light to indicate low link usage. If so, module 12 sets the current operating parameters to off-peak values at step 112. In this step, module 12 switches the mode of operation into off-peak operation. Whether or not a switch is made, module 12 continues processing packets using current operating parameters at step 104.

If module 12 is not currently operating in peak mode at step 108, module 12 determines whether the traffic characteristics indicate high link usage at step 114. For example, module 12 may compare received upstream network traffic information to a threshold to determine whether the expected traffic indicates high link usage. Similarly, module 12 may compare link usage statistics against thresholds to make a determination. If the traffic characteristics indicate high link usage, module 12 sets current operating parameters to peak values at step 116. This switches the mode of operation into peak operating mode. Whether or not module 12 switches the mode of operation, module 12 continues processing packets using current operating parameters at step 104.

The preceding flowchart illustrates an exemplary method for dual mode multiplexing of packets. However, while specific steps and operations are described, system 10 contemplates module 12 using any suitable techniques and elements for performing similar techniques. For example, while described as initially operating in peak mode, other techniques may start up in any appropriate mode. Moreover, many of the steps in this flowchart may take simultaneously and/or in different orders than as shown. In addition, module 12 may use methods with additional steps, fewer steps, and/or different steps, so long as the methods remain appropriate.

FIG. 5 is a flowchart illustrating a method for dynamically adjusting packet multiplexing operations based upon internally calculated link efficiency statistics. Module 12 initializes buffer size and timeout value parameters at step 130. For example, module 12 may initialize these parameters to peak values. Module 12 initializes expected operating characteristics at step 132. For example, module 12 may access configured operating characteristics within a memory, with the expected operating characteristics indicating pre-determined characteristics of healthy packet multiplexing operations.

Module 12 multiplexes received packets using the current parameters at step 134. Based upon recent multiplexing operations, module 12 calculates link efficiency statistics at step 136. For example, as previously discussed, module 12 can determine a percentage of recently processed multiplexed packets that were communicated as a result of timing out. Module 12 compares these statistics to expected operating characteristics at step 138. For example, module 12 can compare calculated percentages to various thresholds for expected operating characteristics.

Module 12 determines whether the calculated statistics vary from expected operating characteristics at step 140. If so, module 12 modifies current operating parameters at step 142. For example, as previously discussed, if the calculated statistics indicate that the timeout value is resulting in a proportionately large number of multiplexed packets, module 12 can reduce the buffer size parameter. Alternatively, if module 12 determines that the timeout value is causing a proportionately small number of multiplexed packets, module 12 can increase the buffer size parameter. Using various step values and a range of buffer size values, module 12 can provide for two or more modes of operation.

The preceding flowchart and accompanying description illustrate only an exemplary method of operation, and system 10 contemplates module 12 using any suitable techniques and elements for varying operating parameters based upon internal monitoring of operations. Thus, many of the steps in this flowchart may take place simultaneously and/or in different orders than as shown. Moreover, module 12 may use methods with additional steps, fewer steps, and/or different steps, so long as the methods remain appropriate. In addition, system 10 contemplates module 12 using a variety of information and criteria for varying modes of operation. Thus, system 10 contemplates module 12 using techniques embodied within the preceding two flowcharts as well as additional techniques together or separately as appropriate to determine current modes of multiplexing packets.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for multiplexing packets across varying traffic densities, the method comprising:
   initializing operating parameters using a first set of multiplexing parameters designed for a first level of packet traffic;
   receiving packets using a first interface;
   forming a multiplexed packet with one or more of the received packets each time the operating parameters are satisfied;
   transmitting each formed multiplexed packet using a second interface;
   monitoring operating characteristics that predict traffic density at the first interface;
   determining that the operating characteristics indicate traffic density below a threshold; and
   in response to the determination, reinitializing the operating parameters using a second set of multiplexing parameters designed for a second level of packet traffic.

2. The method of claim 1, wherein the operating parameters comprise a buffer size and a timeout value.

3. The method of claim 2, wherein forming a multiplexed packet comprises:
   initializing a timer;
   receiving packets using the first interface;
   determining that received packets meet or exceed the buffer size or that the timer meets or exceeds the timeout value; and
   based on the determination, generating a multiplexed packet having a header and a payload portion that aggregates the received packets.

4. The method of claim 2, wherein a buffer size value specified by the first set of multiplexing parameters is greater than a buffer size value specified by the second set of multiplexing parameters.

5. The method of claim 1, wherein monitoring operating characteristics comprises receiving upstream traffic information from one or more devices coupled to the first interface, the devices transmitting packets to the first interface for transmission by the second interface.

6. The method of claim 1, wherein monitoring operating characteristics comprises tracking link utilization statistics for the second interface.

7. The method of claim 1, wherein:
   monitoring operating characteristics comprises tracking recent performance in forming multiplexed packets; and
   determining that the operating characteristics indicate traffic density below the threshold comprises comparing the recent performance to expected operating characteristics.

8. The method of claim 7, wherein the expected operating characteristics specify a percentage of times that a multiplexed packet will be formed as a result of a timeout.

9. A link efficiency module comprising:
   a first interface operable to receive packets;
   a controller operable to initialize operating parameters using a first set of multiplexing parameters designed for a first level of packet traffic, to form a multiplexed packet with one or more of the received packets each time the operating parameters are satisfied, to monitor operating characteristics that predict traffic density at the first interface, to determine that the operating characteristics indicate traffic density below a threshold, and in response to the determination, to reinitialize the operating parameters using a second set of multiplexing parameters designed for a second level of packet traffic; and a second interface operable to transmit each formed multiplexed packet.

10. The module of claim 9, wherein the operating parameters comprise a buffer size and a timeout value.

11. The module of claim 10, wherein the controller is operable to form a multiplexed packet by:
   initializing a timer;
   tracking packets received using the first interface;
   determining that received packets meet or exceed the buffer size or that the timer meets or exceeds the timeout value; and
   based on the determination, generating a multiplexed packet having a header and a payload portion that aggregates the received packets.

12. The module of claim 10, wherein a buffer size value specified by the first set of multiplexing parameters is greater than a buffer size value specified by the second set of multiplexing parameters.

13. The module of claim 9, wherein the controller is operable to monitor operating characteristics by receiving upstream traffic information from one or more devices coupled to the first interface, the devices transmitting packets to the first interface for transmission by the second interface.

14. The module of claim 9, wherein the controller is operable to monitor operating characteristics by tracking link utilization statistics for the second interface.

15. The module of claim 9, wherein the controller is operable to:
   monitor operating characteristics by tracking recent performance in forming multiplexed packets; and
   determine that the operating characteristics indicate traffic density below the threshold by comparing the recent performance to expected operating characteristics.

16. The module of claim 15, wherein the expected operating characteristics specify a percentage of times that a multiplexed packet will be formed as a result of a timeout.

17. A computer readable medium encoded with computer executable instruction for multiplexing packets across varying traffic densities, wherein the instructions are operable when executed to:
   initialize operating parameters using a first set of multiplexing parameters designed for a first level of packet traffic;
   receive packets using a first interface;
   form a multiplexed packet with one or more of the received packets each time the operating parameters are satisfied;
   transmit each formed multiplexed packet using a second interface;
   monitor operating characteristics that predict traffic density at the first interface;
   determine that the operating characteristics indicate traffic density below a threshold; and
   in response to the determination, reinitialize the operating parameters using a second set of multiplexing parameters designed for a second level of packet traffic.

18. The computer readable medium of claim 17, wherein the operating parameters comprise a buffer size and a timeout value.

19. The computer readable medium of claim 18, operable to form a multiplexed packet by:
   initializing a timer;
   receiving packets using the first interface;
   determining that received packets meet or exceed the buffer size or that the timer meets or exceeds the timeout value; and
   based on the determination, generating a multiplexed packet having a header and a payload portion that aggregates the received packets.

20. The computer readable medium of claim 18, wherein a buffer size value specified by the first set of multiplexing parameters is greater than a buffer size value specified by the second set of multiplexing parameters.

21. The computer readable medium of claim 17, operable to monitor operating characteristics by receiving upstream traffic information from one or more devices coupled to the first interface, the devices transmitting packets to the first interface for transmission by the second interface.

22. The computer readable medium of claim 17, operable to monitor operating characteristics by tracking link utilization statistics for the second interface.

23. The computer readable medium of claim 17, operable to:
   monitor operating characteristics by tracking recent performance in forming multiplexed packets; and
   determine that the operating characteristics indicate traffic density below the threshold by comparing the recent performance to expected operating characteristics.

24. The logic of claim 23, wherein the expected operating characteristics specify a percentage of times that a multiplexed packet will be formed as a result of a timeout.

25. A link efficiency module comprising:
   means for initializing operating parameters using a first set of multiplexing parameters designed for a first level of packet traffic;
   means for receiving packets using a first interface;
   means for forming a multiplexed packet with one or more of the received packets each time the operating parameters are satisfied;
   means for transmitting each formed multiplexed packet using a second interface;
   means for monitoring operating characteristics that predict traffic density at the first interface;
   means for determining that the operating characteristics indicate traffic density below a threshold; and
   means for, in response to the determination, reinitializing the operating parameters using a second set of multiplexing parameters designed for a second level of packet traffic.

26. A method for multiplexing packets across varying traffic densities, the method comprising:
   initializing operating parameters using a first set of multiplexing parameters designed for peak packet traffic, wherein the operating parameters comprise a buffer size and a timeout value, and the first set of multiplexing parameters specify a value for the buffer size and a value for the timeout value;
   receiving packets using a first interface;
   forming a multiplexed packet with one or more of the received packets each time the operating parameters are satisfied, wherein the operating parameters are satisfied if received packets meet or exceed the buffer size or a timer meets or exceeds the timeout value;
   transmitting each formed multiplexed packet using a second interface;

monitoring operating characteristics that predict traffic density at the first interface;
determining that the operating characteristics indicate traffic density below a threshold; and
in response to the determination, reinitializing the operating parameters using a second set of multiplexing parameters designed for off-peak packet traffic, wherein the second set of multiplexing parameters specify a second value for the buffer size and a second value for the timeout value, the second value for the buffer size less than the first value for the buffer size.

* * * * *